United States Patent
Akazawa

(10) Patent No.: US 12,093,754 B2
(45) Date of Patent: Sep. 17, 2024

(54) PROCESSOR, INFORMATION PROCESSING APPARATUS, AND INFORMATION PROCESSING METHOD

(71) Applicant: Fujitsu Limited, Kawasaki (JP)

(72) Inventor: Tadafumi Akazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 34 days.

(21) Appl. No.: 17/897,611

(22) Filed: Aug. 29, 2022

(65) Prior Publication Data

US 2023/0176932 A1 Jun. 8, 2023

(30) Foreign Application Priority Data

Dec. 8, 2021 (JP) .................................. 2021-199289

(51) Int. Cl.
G06F 3/01 (2006.01)
G06F 9/30 (2018.01)
G06F 9/54 (2006.01)
G06F 13/40 (2006.01)

(52) U.S. Cl.
CPC .......... G06F 9/542 (2013.01); G06F 9/30101 (2013.01); G06F 13/4031 (2013.01)

(58) Field of Classification Search
CPC .. G06F 9/542; G06F 9/30101; G06F 13/4031; Y02D 10/00
See application file for complete search history.

(56) References Cited

U.S. PATENT DOCUMENTS

| | | | | |
|---|---|---|---|---|
| 8,738,860 | B1 * | 5/2014 | Griffin | G06F 12/0897 711/122 |
| 2011/0161586 | A1 * | 6/2011 | Potkonjak | G06F 12/084 711/E12.024 |
| 2014/0025925 | A1 * | 1/2014 | Kondo | G06F 15/80 712/30 |
| 2014/0146931 | A1 * | 5/2014 | Sagi | G06F 1/12 375/362 |
| 2014/0359225 | A1 * | 12/2014 | Lee | G06F 12/0888 711/130 |
| 2017/0068575 | A1 * | 3/2017 | Hardage, Jr. | G06F 12/0813 |
| 2020/0410323 | A1 * | 12/2020 | Vinod | G06F 13/1642 |

FOREIGN PATENT DOCUMENTS

JP 2019-191789 A 10/2019

* cited by examiner

*Primary Examiner* — Kevin L Young
*Assistant Examiner* — Abdou K Seye

(57) ABSTRACT

A processor includes a plurality of cores to which individual destination notification dedicated lines are coupled. A destination core selection circuit receives a plurality of packets having some of the cores as destinations, respectively, for arbitration, and selects one first core from among the cores serving as the destinations of the plurality of packets. A data matching circuit compares first transmission data included in a packet for the first core with second transmission data included in a packet for the core other than the first core serving as a destination to participate in the arbitration, extracts one or more second cores of which the second transmission data matches the first transmission data, designates the first core and the second core as the destinations by using the destination notification dedicated lines, and transmits the first transmission data via a data notification line.

7 Claims, 10 Drawing Sheets

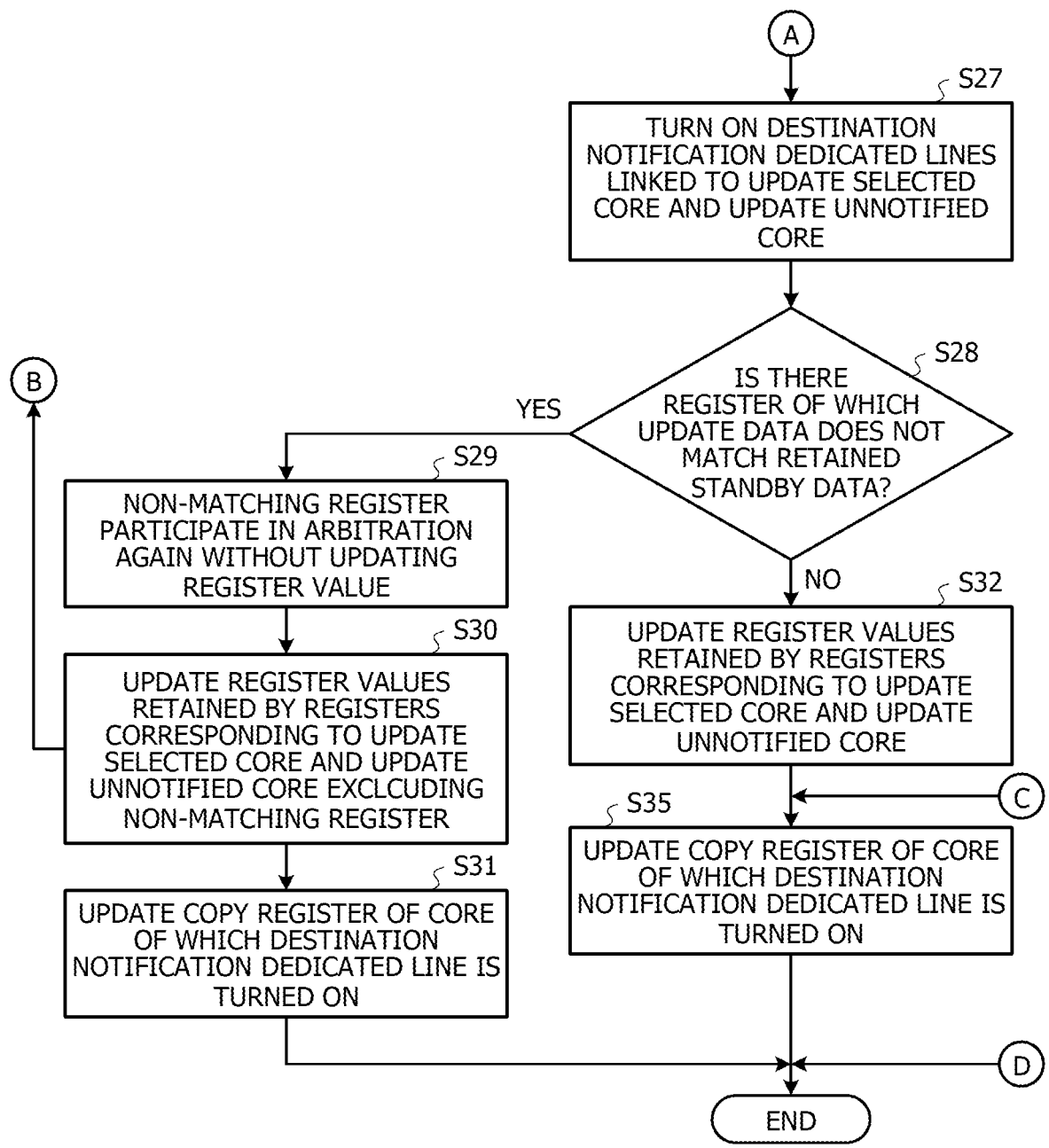

PROCESSOR, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2021-199289, filed on Dec. 8, 2021, the entire contents of which are incorporated herein by reference.

FIELD

The embodiments discussed herein are related to a processor, an information processing apparatus, and an information processing method.

BACKGROUND

In recent years, a manycore technique in which a plurality of cores is implemented for one processor has been developed, and the use of the processor in which the plurality of cores is implemented has been increased. There is a technique in which, in such a processor in which the plurality of cores is implemented, register values managed in the center of the processor are transferred to the plurality of cores and each core performs processing. For example, this technique is used when barrier synchronization is executed in a field of high-performance computing (HPC). In this technique, a dedicated line is provided from a register to a core for each destination, and thus, a packet may be transferred in parallel when an identical register value is sent to the plurality of cores. Accordingly, latency may be reduced.

For example, in a case where the processor having the plurality of cores has a function of using control between the cores, a central control unit that manages the register is disposed in the processor, and each core retains a copy of the register. In a case where the register value is updated, the central control unit notifies the copy register included in each core of a latest value by packetizing an updated value of the register and notifying each core of the packetized value. Accordingly, since each core may acquire the register value while referring to the copy register inside the core without referring to the value for the central control unit, latency of a read command of the register value may be reduced.

A technique in which data representing a state of an interrupt notification signal and identification information of an arithmetic operation unit that is an output source of a signal are output, data is written to a register corresponding to the arithmetic operation unit that is the output source, and an interrupt is activated based on the written data has been proposed as a technique using a register value.

Japanese Laid-open Patent Publication No. 2019-191789 is disclosed as related art.

SUMMARY

According to an aspect of the embodiments, a processor including: a plurality of cores to which individual destination notification dedicated lines are coupled, respectively; a destination core selection circuit that receives a plurality of packets having some of the cores as destinations, respectively, to perform arbitration, and selects one first core from among the cores serving as the destinations of the plurality of packets; and a data matching circuit that compares first transmission data included in a packet for the first core selected by the destination core selection circuit with second transmission data included in a packet for the core other than the first core serving as a destination to participate in the arbitration, extracts one or more second cores of which the second transmission data matches the first transmission data, designates the first core and the second core as the destinations by using the destination notification dedicated lines, and transmits the first transmission data via a data notification line.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A and FIG. 9B are divided charts of a flowchart of register value update processing in a CPU according to Embodiment 2.

DESCRIPTION OF EMBODIMENTS

Even in a case where the same register value is sent to the plurality of cores in a method for notifying each core of the register value in the related art, processing of sequentially selecting the cores by arbitration and sending the packet to the selected core is repeated for the number of cores of transmission destinations. As described above, the processor sends the packet while alternately performing transmission of the register value to the core and arbitration by the arbitration circuit, and thus, a time until transmission of all packets is completed increases whenever the number of cores of the transmission destinations increases. Thus, for example, in a case where the completion of the barrier synchronization between the cores is notified or the like, a delay in the notification of the register value affects arithmetic operation performance. Accordingly, in order to solve the delay in the notification of the register value, it is conceivable to provide a dedicated bus for a data notification line for packet transmission for notifying the register value between all the cores and the central control unit. However, there is pressure on a wiring area, and thus, it is difficult to solve the delay.

In the related art in which the interrupt is controlled by using the data indicating the state of the interrupt notification signal and the identification information of the arithmetic operation unit that is the output source of the signal, the number of signal lines used for interrupt communication may be reduced, but it is difficult to reduce the delay in the notification of the register value. Accordingly, it is difficult to suppress a decrease in the arithmetic operation performance due to the delay in the notification of the register value.

A disclosed technology has been made in view of the above-described circumstances, and an object of the disclosed technology is to provide a processor, an information processing apparatus, and an information processing method that improve arithmetic operation performance.

Hereinafter, embodiments of a processor, an information processing apparatus, and an information processing method disclosed in the present application will be described in detail with reference to the drawings. The processor, the information processing apparatus, and the information processing method disclosed in the present application are not limited to the following embodiments.

Embodiment 1

Figure 1:
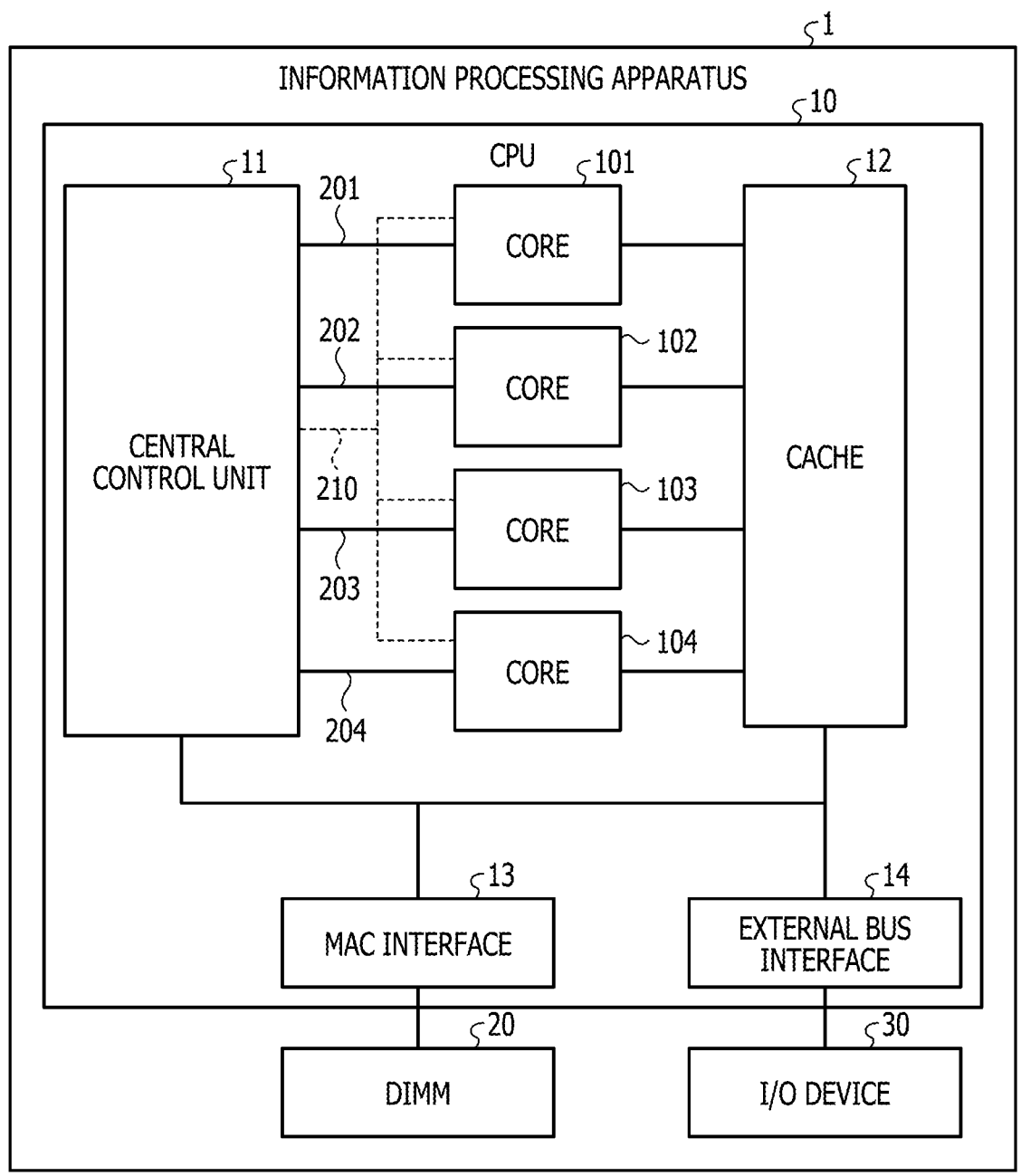
FIG. 1 is a schematic configuration diagram of an information processing apparatus.

FIG. 1 is a schematic configuration diagram of an information processing apparatus. An information processing apparatus 1 includes a central processing unit (CPU) 10, a dual inline memory module (DIMM) 20, and an input and output (I/O) device 30.

The CPU 10 includes a central control unit 11, cores 101 to 104, a cache 12, a memory access control (MAC) interface 13, and an external bus interface 14. The MAC interface 13 is coupled to the DIMM 20. The external bus interface 14 is coupled to the I/O device 30.

The central control unit 11 is individually coupled to the cores 101 to 104 by destination notification dedicated lines 201 to 204, respectively. The central control unit 11 is coupled to the cores 101 to 104 by a data notification line 210, which may be a multi-bit bus. The central control unit 11 performs management such as updating and retaining of register values to be used by the cores 101 to 104 in an arithmetic operation. For example, upon updating the retained register value, the central control unit 11 notifies the cores 101 to 104 that use the updated register value of a new register value.

The cores 101 to 104 execute arithmetic operation processing by using the register value notified by the central control unit 11, data stored in the DIMM 20, and the like. The notification processing of the register value in the CPU 10 will be described in detail later. The cores 101 to 104 store an execution command generated by the arithmetic operation processing in the cache 12. Although four cores 101 to 104 are illustrated as an example in FIG. 1, the number of cores is not particularly limited as long as there are a plurality of cores. Since all of the cores 101 to 104 perform similar operations, these cores are referred to as "cores 100" in a case where these cores are not distinguished from each other, respectively, in the following description.

The cache 12 is coupled to the central control unit 11, the MAC interface 13, and the external bus interface 14. The cache 12 stores an execution command output from the core 100. Depending on a destination, the execution command stored in the cache 12 is output to the central control unit 11, the DIMM 20, and the I/O device 30.

The DIMM 20 is a main storage device. The DIMM 20 stores data to be used by the core 100 or the like in an arithmetic operation. In accordance with an execution command sent via the MAC interface 13, the DIMM 20 reads and writes data.

The I/O device 30 includes, for example, a hard disk, a solid-state drive (SSD), a network interface, or the like. The I/O device 30 operates in accordance with an execution command sent via the external bus interface 14.

Figure 2:
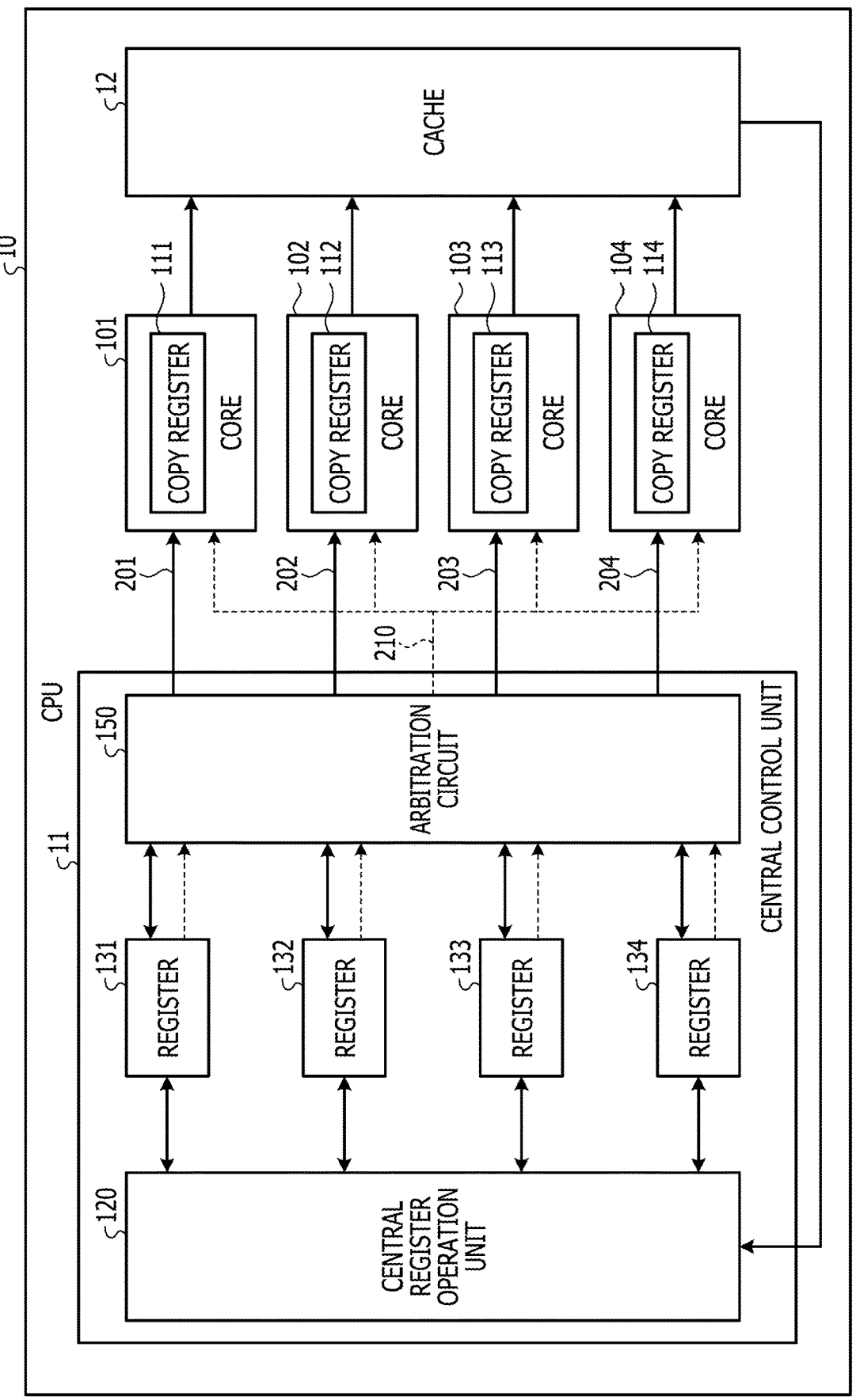
FIG. 2 is a configuration diagram illustrating details of a CPU.

FIG. 2 is a configuration diagram illustrating details of the CPU. Next, the notification processing of the register value of the CPU will be described in detail with reference to FIG. 2.

The cores 101 to 104 include copy registers 111 to 114, respectively. For example, the cores 101 to 104 check the register values stored in the copy registers 111 to 114, execute barrier synchronization, and proceed with arithmetic operation processing. Hereinafter, the copy registers 111 to 114 are referred to as "copy registers 110" in a case where these copy registers are not distinguished from each other, respectively. When the register value is used, the core 100 may perform an arithmetic operation by using the register value stored in the copy register 110 retained by the core 100 itself without accessing the corresponding one of registers 131 to 134.

Next, an operation of the central control unit 11 will be described. As illustrated in FIG. 2, the central control unit 11 includes a central register operation unit 120, the registers 131 to 134, and an arbitration circuit 150. Broken line arrows in FIG. 2 indicate flows of data representing the register value. Solid line arrows in FIG. 2 indicate flows of various kinds of control data.

The registers 131 to 134 are arranged so as to correspond to the cores 101 to 104, respectively. The register value retained by the register 131 is a register value to be used by the core 101. The register value retained by the register 132 is a register value to be used by the core 102. The register value retained by the register 133 is a register value to be used by the core 103. The register value retained by the register 134 is a register value to be used by the core 104. For example, the register value retained by the register 131 is copied to the copy register 111 included in the core 101, and the core 101 performs arithmetic operation processing by using the register value stored in the copy register 111. Since all of the registers 131 to 134 perform similar operations, these registers are referred to as "registers 130" in the following description in a case where these registers are not distinguished from each other, respectively.

The register 130 generates a register value notification packet for notifying the retained register value. The register value notification packet includes identification information of the core 100 serving as a destination and a register value to be used by the core 100. The register 130 outputs the generated packet to the arbitration circuit 150 via a path indicated by a broken line in the drawing.

Upon receiving an instruction to update the register value, the register 130 retains, as standby data, a new register value which is update data while maintaining an old register value. The register 130 generates the register value notification packet including the new register value and the identification information of the core 100 serving as the destination, and outputs the register value notification packet to the arbitration circuit 150. Thereafter, upon receiving an input of a data update command from the arbitration circuit 150, the register 130 updates the register value with the standby data. Thereafter, the register 130 outputs a data update completion notification to the central register operation unit 120.

The central register operation unit 120 acquires, from the cache 12, a control command for the register 130, which is output from the core 100. In accordance with the control command, the central register operation unit 120 controls the register 130.

For example, the central register operation unit 120 receives a control command to change the register value from the core 100. In this case, the central register operation unit 120 updates the register value of the register 130 designated in accordance with the control command. For example, the central register operation unit 120 outputs a new register value serving as update data to the register 130. Thereafter, the data update completion notification is received from the register 130 that is a transmission destination of the update data, and thus, the central register operation unit 120 completes the update of the register value of the register 130.

As illustrated in FIG. 2, the arbitration circuit 150 is individually coupled to the cores 101 to 104 by the destination notification dedicated lines 201 to 204, respectively. Hereinafter, in a case where the destination notification dedicated lines 201 to 204 are not distinguished from each other, respectively, these destination notification dedicated lines are referred to as "destination notification dedicated lines 200". The arbitration circuit 150 receives an input of the register value notification packet from the register 130. The arbitration circuit 150 performs arbitration between register value notification packets and selects the core 100 to become a destination of a register value notification. The arbitration circuit 150 turns on the destination notification dedicated line 200 coupled to the selected core 100 to enable the selected core 100. Thereafter, the arbitration circuit 150 outputs the data update command to the register 130 corresponding to the selected core 100 to update the register value to a new value. Subsequently, the arbitration circuit 150 transmits a new register value to the enabled core 100, and updates the register value retained by the copy register 110 included in the selected core 100 to a new register value.

Figure 3:
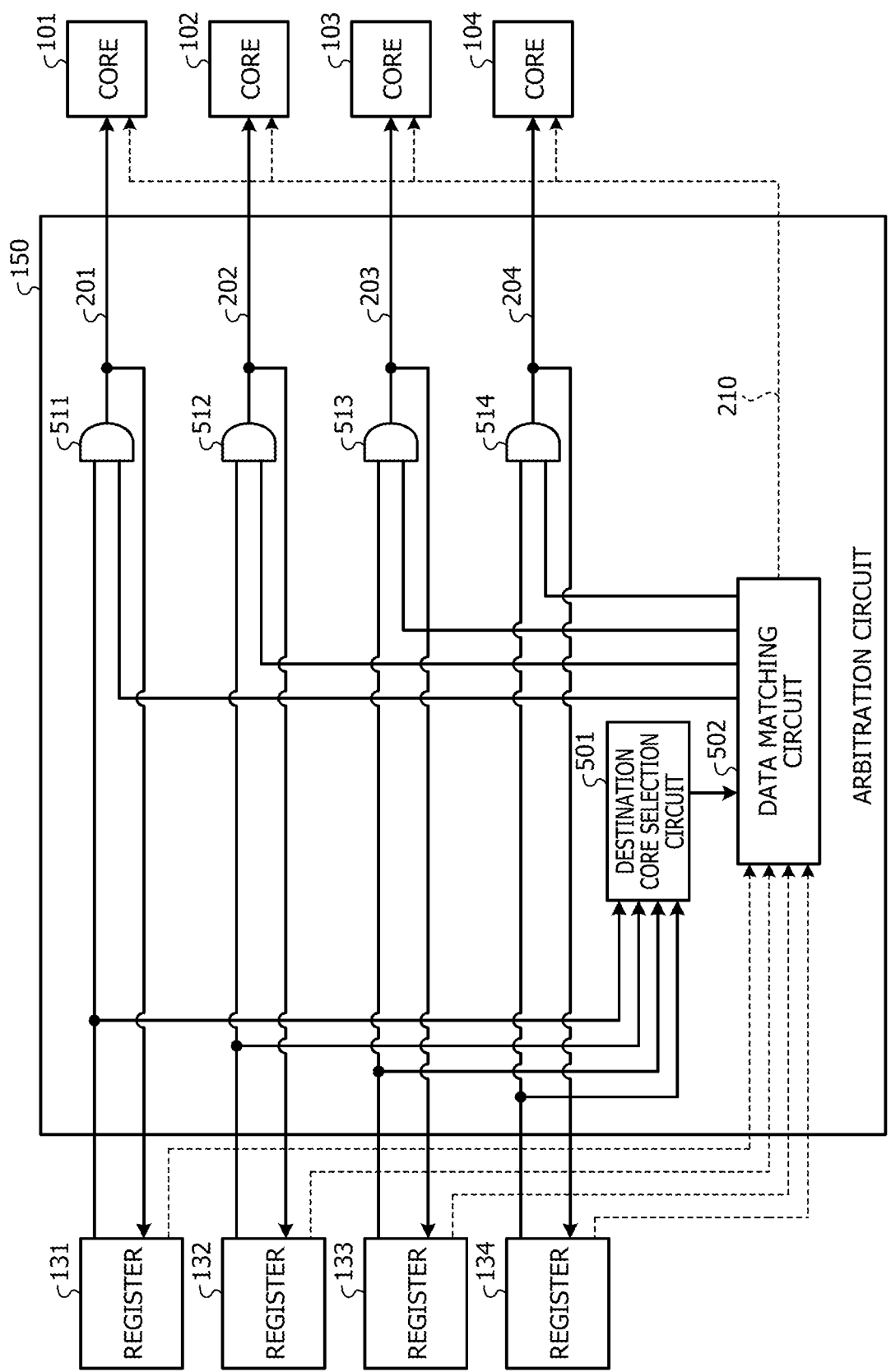
FIG. 3 is a block diagram illustrating details of an arbitration circuit according to Embodiment 1.

FIG. 3 is a block diagram illustrating details of the arbitration circuit according to Embodiment 1. Next, an operation of the arbitration circuit 150 will be described in more detail with reference to FIG. 3. As illustrated in FIG. 3, the arbitration circuit 150 includes a destination core selection circuit 501, a data matching circuit 502, and AND circuits 511 to 514. Since all of the AND circuits 511 to 514 have the same function, these AND circuits are referred to as "AND circuits 510" in the following description in a case where these AND circuits are not distinguished from each other, respectively.

One of two input terminals of the AND circuit 510 is coupled to the register 130. The other of two input terminals of the AND circuit 510 is coupled to the data matching circuit 502. Output terminals of the AND circuits 510 are coupled to the destination notification dedicated lines 200 and are coupled to the corresponding cores 100 via the destination notification dedicated lines 200, respectively. The destination notification dedicated line 200 extending from the AND circuit 510 is branched and coupled to the corresponding register 130.

The AND circuit 510 receives, as one input, an input of a signal for notifying of arbitration participation, which is sent from the corresponding register 130. The signal for notifying of the arbitration participation is included in the register value notification packet generated by the register 130. In a case where the register value retained by the register 130 is updated, the signal for notifying of the arbitration participation is turned on. The AND circuit 510 receives, as the other input, an input of a destination selection signal from the data matching circuit 502. In a case where the core 100 coupled to the AND circuit 510 that is an input destination is selected as a destination to which the register value that is the update data is transmitted by the data matching circuit 502, the destination selection signal is turned on. In a case where both of the signal for notifying of the arbitration participation and the destination selection signal are turned on, the AND circuit 510 turns on the destination notification dedicated line 200 to enable the core 100 that is a coupling destination.

The destination core selection circuit 501 acquires the signal for notifying of the arbitration participation which is sent to each AND circuit 510. In a case where the signal for notifying of the arbitration participation is ON, the cores 100 that are destinations of the signal for notifying of the arbitration participation are the cores 100 that participate in the arbitration. The destination core selection circuit 501 selects one core 100 as the core 100 that is the destination to which the register value is transmitted, from among the cores 100 that participate in the arbitration. The selection may be based on round-robin method or Least-Recently-Used method. The core 100 selected as the destination to which the register value is transmitted is referred to as an "update selected core 100". Thereafter, the destination core selection circuit 501 outputs, to the data matching circuit 502, information on the update selected core 100 and information on the other cores 100 that are notified of the arbitration participation.

The data matching circuit 502 receives, from the destination core selection circuit 501, an input of the information on the update selected core 100 and the information on the other cores 100 that participate in the arbitration. The data matching circuit 502 receives an input of the register value for each core 100 from the register 130. The register value for the core 100 is generated by the register 130 and is included in the register value notification packet received via a path indicated by a broken line in the drawing.

Among the other cores 100 that participate in the arbitration, the data matching circuit 502 determines whether or not there is an update matching core 100 that is the core 100 of which the register value matches the register value of the update selected core 100. In a case where there is the update matching core 100, the data matching circuit 502 determines whether or not there is an update unnotified core 100 of which the update notification of the register value is yet to be performed among the update matching cores 100.

When there is no update unnotified core 100, the data matching circuit 502 turns on the destination selection signal to be input to the AND circuit 510 linked to the update selected core 100. In this case, the data matching circuit 502 maintains the destination selection signal to be input to the AND circuit 510 linked to another core 100 in the off state. Accordingly, the destination notification dedicated line 200 linked to the update selected core 100 is turned on, and the destination notification dedicated lines 200 linked to the other cores 100 are maintained in the off state. In this case, a signal for turning on the destination notification dedicated line 200, which is output from the AND circuit 510 corresponding to the update selected core 100, is input, as the data update command, to the register 130 corresponding to the update selected core 100. Accordingly, the register value of the register 130 corresponding to the update selected core 100 is updated.

By contrast, in a case where there is the update unnotified core 100, the data matching circuit 502 turns on the destination selection signal to be input to the AND circuits 510 linked to the update selected core 100 and the update unnotified core 100. In this case, the data matching circuit 502 maintains the destination selection signal to be input to the AND circuits 510 linked to the cores 100 other than the update selected core 100 and the update unnotified core 100 in the off state. Accordingly, the destination notification dedicated lines 200 linked to the update selected core 100 and the update unnotified core 100 are turned on, and the destination notification dedicated lines 200 linked to the other cores 100 are maintained in the off state. In this case, the signal for turning on the destination notification dedicated line 200, which is output from the AND circuit 510 corresponding to the update selected core 100 and the update unnotified core 100, respectively, is input, as the data update command, to the register 130 corresponding to the update selected core 100. Accordingly, the register value of the register 130 corresponding to the update selected core 100 and the update unnotified core 100, respectively, is updated.

The data matching circuit 502 transmits the register value, which is the update data included in the register value notification packet having the update selected core 100 as the destination, to the core 100 of which the coupled destination notification dedicated line 200 is turned on, by using the data notification line 210. Accordingly, the register value retained by the copy register 110 included in the core 100 of which the coupled destination notification dedicated line 200 is turned on is updated.

Figure 4:
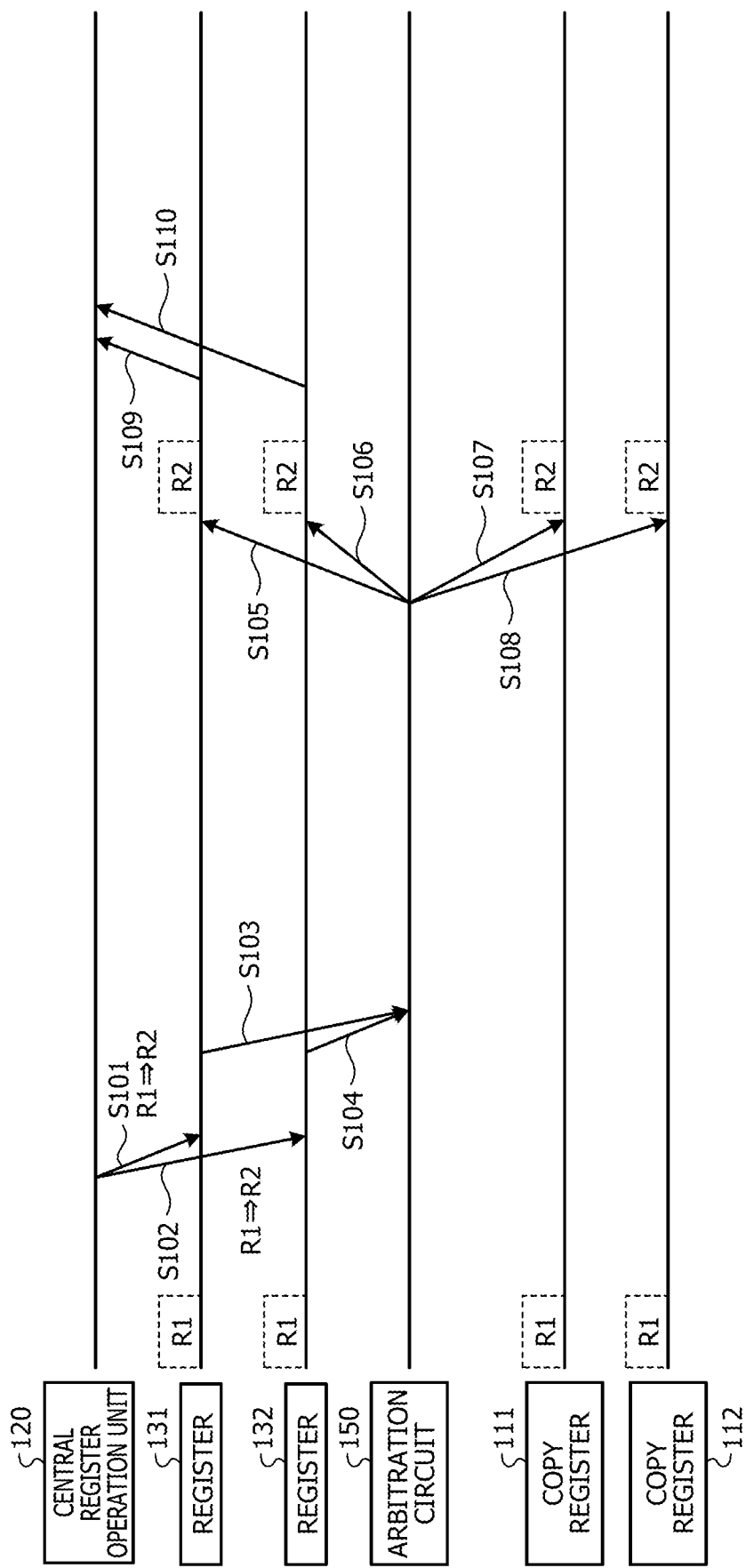
FIG. 4 is a sequence diagram of register value update processing according to Embodiment 1.

FIG. 4 is a sequence diagram of register value update processing according to Embodiment 1. Arrows that couple axes represent exchange of data or command signals. A symbol indicated by a broken line frame on each axis represents a register value retained at this point in time. For example, in this case, the processing is started from a state where the registers 131 and 132 and the copy registers 111 and 112 retain R1 as register values. A case where the register values retained by the registers 131 and 132 are updated to the same value will be described as an example.

The central register operation unit 120 transmits R2 that is the register value to the registers 131 and 132 (steps S101 and S102).

The register 131 retains R2 as the standby data while maintaining R1 as the register value. The register 131 generates a register value notification packet in which the destination is the core 101 and the register value of the update data is R2. Thereafter, the register 131 outputs the generated register value notification packet to the arbitration circuit 150 and causes the core 101 to participate in the arbitration (step S103).

The register 132 generates a register value notification packet in which the destination is the core 102 and the register value of the update data is R2. The register 132 outputs the generated register value notification packet to the arbitration circuit 150, and causes the core 102 to participate in the arbitration (step S104).

Thereafter, the arbitration circuit 150 performs arbitration and selects the core 101 as the update selected core 100. The arbitration circuit 150 selects, as the update matching core 100, the core 102 of which the register value matches the register value of the core 101. Since the update notification of the register value of the core 102 is yet to be performed, the core 102 is set as the update unnotified core 100. The arbitration circuit 150 outputs the data update command to the registers 131 and 132. Accordingly, the register values of the registers 131 and 132 are updated to R2 (steps S105 and S106).

The arbitration circuit 150 turns on the destination notification dedicated lines 201 and 202 linked to the core 101 that is the update selected core 100 and the core 102 that is the update unnotified core 100, respectively. The arbitration circuit 150 outputs, as update data, R2 that is the register value by using the data notification line 210. Accordingly, the arbitration circuit 150 transmits R2 as the register value of the update data to the copy registers 111 and 112 included in the cores 101 and 102 of which the destination notification dedicated lines 201 and 202 are turned on. The copy registers 111 and 112 receive inputs of the update data, and update the register values from R1 to R2 that is the standby data (steps S107 and S108).

The registers 131 and 132 transmit the data update completion notifications to the central register operation unit 120 (steps S109 and S110). Accordingly, the register value update processing is completed.

Figure 5:
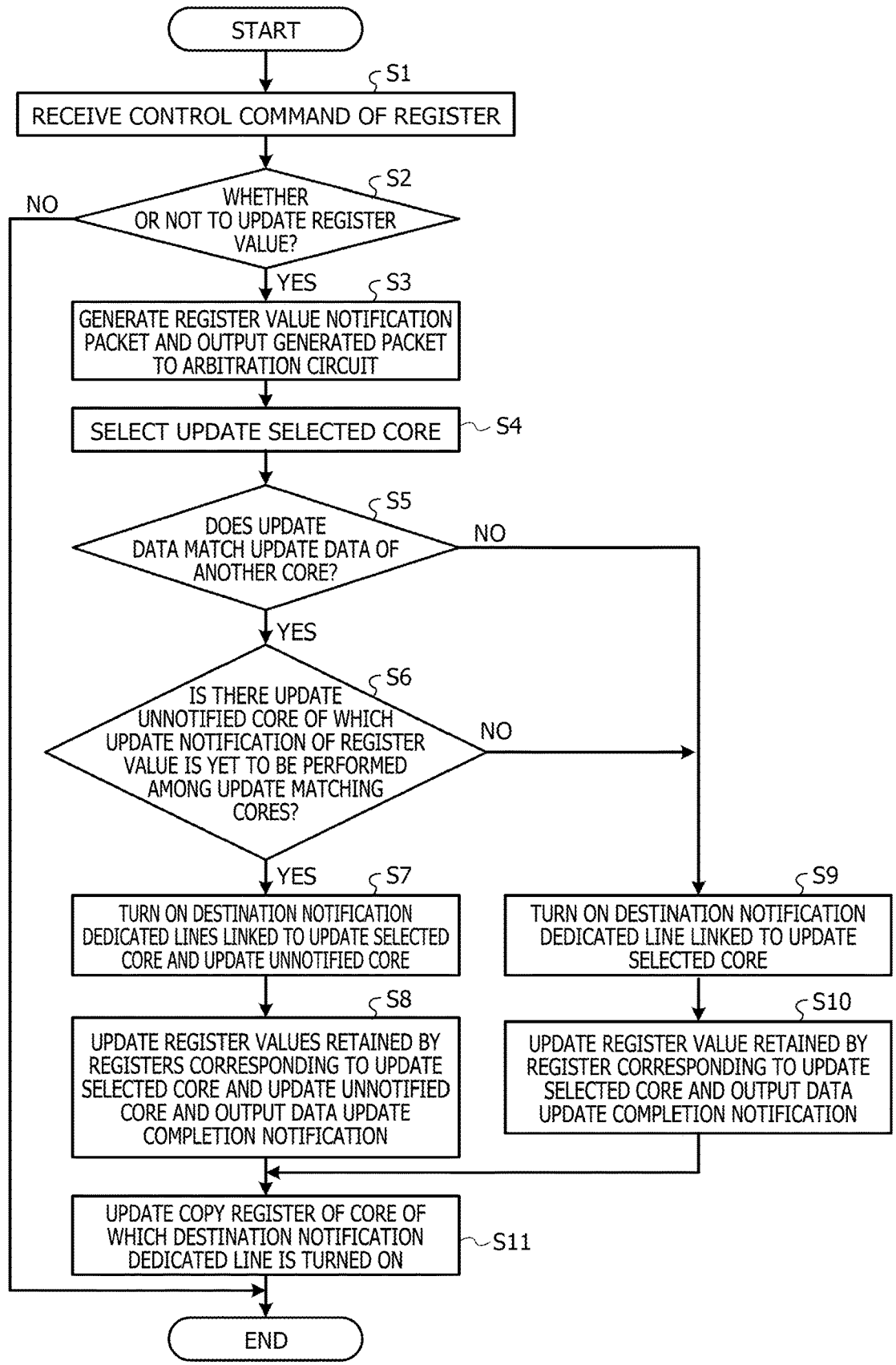
FIG. 5 is a flowchart of register value update processing in the CPU according to Embodiment 1.

FIG. 5 is a flowchart of register value update processing in the CPU according to Embodiment 1. Next, a flow of the register value update processing in the CPU 10 according to the present embodiment will be described with reference to FIG. 5.

The central register operation unit 120 receives the control command of the register from one or more cores 100 (step S1).

Subsequently, the central register operation unit 120 controls the corresponding register 130 in accordance with the received control command. Each register 130 determines whether or not to update the register value under the control of the central register operation unit 120 (step S2).

In a case where the update of the register value is not performed in all of the registers 130 (step S2: No), the register value update processing is ended.

By contrast, in a case where the update of the register value is performed in any register 130 (step S2: Yes), the register 130 that receives an update command of the register value retains, as the standby data, the new register value that is the update data. The register 130 generates a register value notification packet for notifying of the new register value, outputs the register value notification packet to the arbitration circuit 150, and participates in the arbitration (step S3).

The destination core selection circuit 501 of the arbitration circuit 150 receives the input of the information on the cores 100 that participate in the arbitration included in the register value notification packet. The destination core selection circuit 501 selects one update selected core 100 from among the cores 100 that participate in the arbitration (step S4). Thereafter, the destination core selection circuit 501 outputs the information on the update selected core 100 and information on cores 100 that participate in another arbitration to the data matching circuit 502.

The data matching circuit 502 receives, from the destination core selection circuit 501, the input of the information on the update selected core 100 and the information on the cores 100 that participate in another arbitration. The data matching circuit 502 determines whether or not the register value that is the update data of the update selected core 100 matches the register value that is the update data of the core 100 that participate in another arbitration (step S5).

In a case where there is the core 100 of which the update data matches the update data of the update selected core 100 among the cores 100 that participate in another arbitration (step S5: Yes), the data matching circuit 502 determines whether or not there is the update unnotified core 100 of which the update notification of the register value is yet to be performed among the update matching cores 100 (step S6).

In a case where there is the update unnotified core 100 among the update matching cores 100 (step S6: Yes), the data matching circuit 502 turns on the destination selection signal to be input to the AND circuits 510 linked to the update selected core 100 and the update unnotified core 100. Accordingly, the arbitration circuit 150 turns on the destination notification dedicated lines 200 linked to the update selected core 100 and the update unnotified core 100 (step S7).

Thereafter, the arbitration circuit 150 outputs, as the data update command, a signal similar to the signal for turning on the destination notification dedicated line 200 to the registers 130 corresponding to the update selected core 100 and the update unnotified core 100. Accordingly, the register values of the registers 130 corresponding to the update selected core 100 and the update unnotified core 100 are updated to the standby data. Thereafter, the register 130 of which the register value is updated outputs an update completion notification to the central register operation unit 120 (step S8). Thereafter, the register value update processing proceeds to step S11.

By contrast, in a case where there is no update matching core 100 of which the update data matches the update data of the update selected core 100 among the cores 100 that participate in another arbitration (step S5: No) and in a case where there is no update unnotified core 100 among the update matching cores 100 (step S6: No), the following processing is performed. The data matching circuit 502 turns on the destination selection signal to be input to the AND circuit 510 linked to the update selected core 100. Accordingly, the arbitration circuit 150 turns on the destination notification dedicated line 200 linked to the update selected core 100 (step S9).

Thereafter, the arbitration circuit 150 outputs, as the data update command, the signal similar to the signal for turning on the destination notification dedicated line 200 to the register 130 corresponding to the update selected core 100. Accordingly, the register value of the register 130 corresponding to the update selected core 100 is updated to the standby data. Thereafter, the register 130 of which the register value is updated outputs the update completion notification to the central register operation unit 120 (step S10). Thereafter, the register value update processing proceeds to step S11.

Subsequently, the arbitration circuit 150 transmits a register value, which is update data, to the copy register 110 of the core 100 for which the destination notification dedicated line 200 is turned on, and updates the register value retained by the copy register 110 with a new register value (step S11).

As described above, in a case where a register value of a specific core is updated, when there is the core of which the register value is updated to the same value, the processor according to the present embodiment collectively updates the register value of the specific core and the core of which the register value is updated to the same value. Accordingly, the processor may shorten a time in a case where the plurality of register values are rewritten. For example, in a case where the barrier synchronization between the cores is performed, a large number of cores are notified of the same register value. Thus, a delay in the notification of the register value may be reduced, and arithmetic operation performance may be improved. Since there is no addition of the dedicated line or the like for notifying of the register value, an increase in a wiring area may be suppressed.

Embodiment 2

Figure 6:
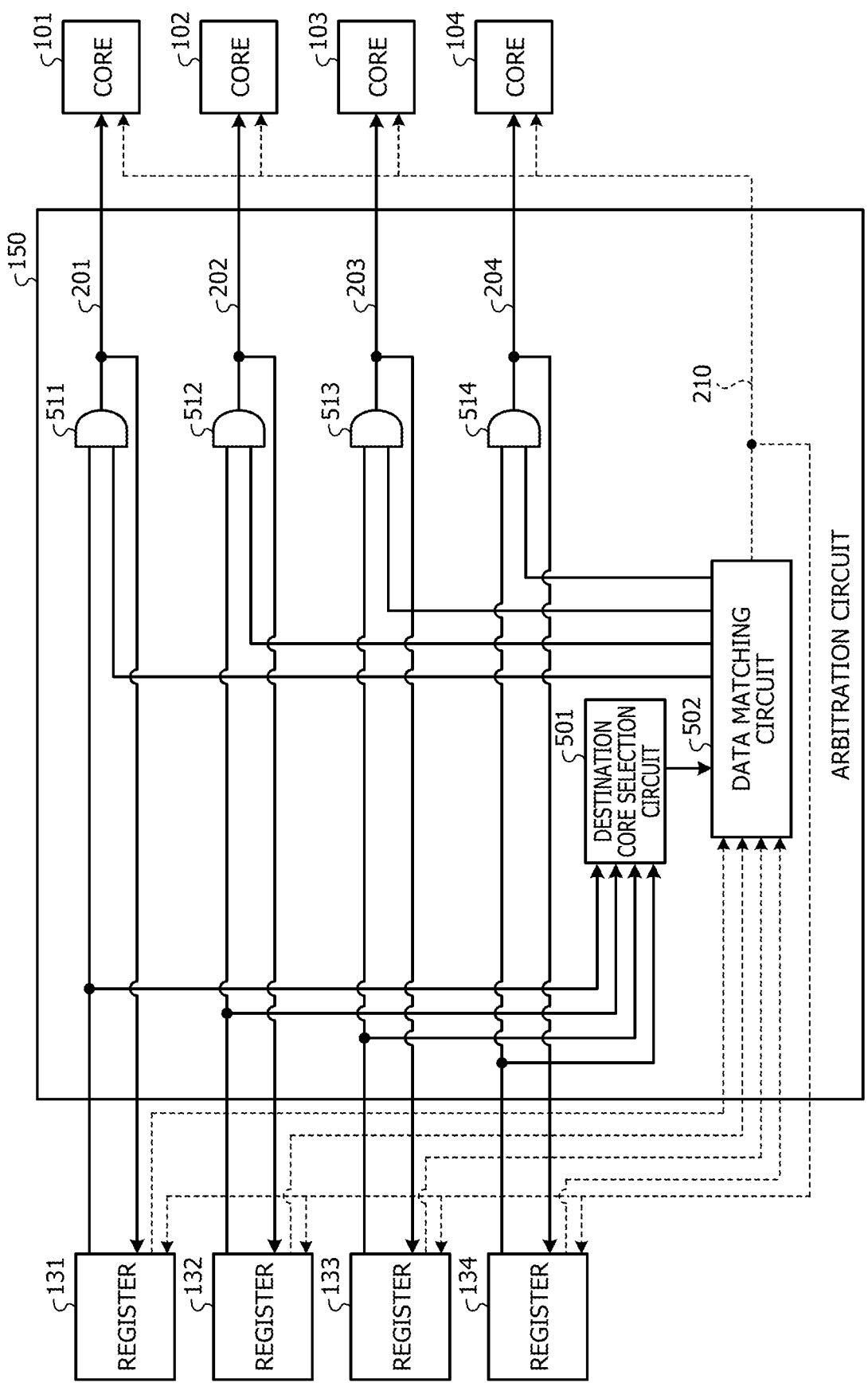
FIG. 6 is a block diagram illustrating details of an arbitration circuit according to Embodiment 2.

FIG. 6 is a block diagram illustrating details of an arbitration circuit according to Embodiment 2. A CPU 10 according to the present embodiment is different from Embodiment 1 in that, in a case where an additional update command of the register value is received before the update by the update data is performed, a subsequent register value update command is executed. In the following description, operations of components similar to the operations of the components in Embodiment 1 will not be described.

As illustrated in FIG. 6, in the arbitration circuit 150 according to the present embodiment, the data notification line 210 extending from the data matching circuit 502 to the core 100 is branched and coupled to each register 130. The register 130 has a function of comparing the register value input from the data notification line 210 with the register value retained as the standby data.

Upon receiving an input of a new register value that is the update data from the central register operation unit 120, the register 130 retains the register value that is the update data as the standby data. The register 130 causes the corresponding core 100 to participate in the arbitration by generating the register value notification packet for notifying of the register value that is the update data and outputting the register value notification packet to the arbitration circuit 150.

Upon receiving an input of a new register value as next update data from the central register operation unit 120 before receiving the data update command from the arbitration circuit 150 after participation in the arbitration, the register 130 rewrites the standby data to the register value sent as the next update data. For example, a case where the register 130 performs arbitration participation in a case where an input of a first register value is received as update data and receives an input of a second register value as next update data before a data update command for the first register value after the arbitration participation is received will be described. In this case, the register 130 retains the standby data as the first register value, and then rewrites the standby data from the first register value to the second register value.

Among the registers 130 that participate in the arbitration, the registers 130 corresponding to the update selected core 100 and the update unselected core receive the data update command from the arbitration circuit 150. At this time, in the present embodiment, the register 130 receives the input of the update data from the arbitration circuit 150 via the data notification line 210. When the standby data and the update data match each other, the register 130 updates the register value to the standby data, and outputs the update completion notification to the central register operation unit 120.

By contrast, when the standby data and the update data do not match each other, the register 130 does not update the register value, transmits the register value notification packet having the standby data as the register value that is the update data, and participates in the arbitration again. When the next data update command is received and the standby data and update data match each other, the register 130 updates the register value to the standby data, and outputs the update completion notification to the central register operation unit 120.

For example, a case where the register 130 receives a next new instruction to update the second register value in a state where the register value update processing for the participated arbitration is not completed based on an instruction to update the register value by the first register value will be described. The state where the register value update processing is not completed is a case where the following two states are satisfied. One of the states is a state after the data matching circuit 502 receives, from the destination core selection circuit 501, the information on the update selected core 100 and the other cores 100 that participate in the arbitration and starts destination selection processing. Another one is a state where the data update command does not reach the register 130 corresponding to the core 100 selected as the destination by the data matching circuit 502. Hereinafter, this state is referred to as a "state where previous update processing is not completed".

In this case, the register 130 that retains the second register value as the standby data receives the data update command having the first register value as the update data from the arbitration circuit 150. Since the first register value notified as the update data and the second register value that is the standby data are different, the register 130 stands by without updating the register value. In this case, the register 130 does not output the update completion notification to the central register operation unit 120 either.

Thereafter, the register 130 further receives, from the arbitration circuit 150, the data update command having the second register value as the update data. The register 130 checks that both the notified update data and standby data are the second register values and match each other. Thereafter, since the notified first register value and second register value that is the standby data match each other, the register 130 updates the register value. In this case, the register 130 outputs the update completion notification to the central register operation unit 120.

After arbitration is performed, the destination core selection circuit 501 of the arbitration circuit 150 receives the input of the register value notification packet for notifying of the new register value that is the update data, from the register 130 corresponding to the core 100 that participates in the arbitration. In a case where the data update command is transmitted to the register 130 corresponding to the update selected core 100 or the update unnotified core 100 selected in the previous arbitration, the destination core selection circuit 501 causes the core 100 notified as the destination by the register value notification packet to participate in the arbitration. By contrast, in a case where the previous update processing is in an uncompleted state, the destination core selection circuit 501 transmits information on the notified register value to the data matching circuit 502.

The data matching circuit 502 of the arbitration circuit 150 receives the input of the register value of the update selected core 100 from the destination core selection circuit 501. In a case where there is the update unnotified core 100, the data matching circuit 502 extracts the update unnotified core 100. A case where there is the update unnotified core 100 will be described. However, in a case where there is no update unnotified core 100, the data matching circuit 502 executes the following processing only for the update selected core 100.

The data matching circuit 502 outputs the destination selection signal to the AND circuits 510 linked to the update selected core 100 and the update unnotified core 100, respectively. Accordingly, the destination notification dedicated lines 200 coupled to the update selected core 100 and the update unnotified core 100 are turned on, and the data update command is input to the registers 130 corresponding to the update selected core 100 and the update unnotified core 100, respectively.

After the data update command is output to the register 130 after the previous arbitration is performed, the data matching circuit 502 receives, from the destination core selection circuit 501, the input of the information on the update selected core 100 and the other cores 100 that participate in the arbitration.

By contrast, when a next register value notification packet is transmitted from one of the update selected core 100 or the update unnotified core 100 in the previous arbitration in a state where the previous update processing is not completed, the data matching circuit 502 performs the following processing. In a state where the previous update processing is not completed, the update selected core 100 or the update unnotified core 100 in the previous arbitration to which the register value notification packet is transmitted is referred to as an "additional update core 100".

In this case, the data matching circuit 502 receives, from the destination core selection circuit 501, an input of information on a new register value included in the register value notification packet transmitted from the additional update core 100. Thereafter, the data matching circuit 502 outputs the destination selection signal to the AND circuits 510 linked to the update selected core 100 and the update unnotified core 100 in the previous arbitration while retaining the new register value notified from the additional update core 100, respectively. Accordingly, the data update command is transmitted to the registers 130 corresponding to the update selected core 100 and the update unnotified core 100 in the previous arbitration, respectively. The data matching circuit 502 outputs the update data used for updating the register value corresponding to the previous arbitration to the data notification line 210 and outputs the update data to each register 130. Thereafter, the data matching circuit 502 outputs the destination selection signal to the AND circuit 510 linked to the additional update core 100 to turn on the destination notification dedicated line 200 linked to the additional update core 100. Accordingly, the data update command is transmitted to the register 130 corresponding to the additional update core 100. The data matching circuit 502 outputs the retained new register value notified from the additional update core 100 to the data notification line 210 and outputs the new register value to each register 130.

For example, a case where the update data in the register value update processing corresponding to the previous arbitration is the first register value and then the second register value is transmitted as the update data from the additional update core 100 will be described. As processing corresponding to the previous arbitration, the data matching circuit 502 outputs the destination selection signal to the AND circuits 510 linked to the update selected core 100 and the update unnotified core 100, respectively, in the previous arbitration including the additional update core 100. The data matching circuit 502 outputs, as the update data, information on the first register value to each register 130. As additional update processing, the data matching circuit 502 outputs the destination selection signal to the AND circuit 510 linked to the additional update core 100. The data matching circuit 502 outputs, as the update data, information on the second register value to each register 130.

Figure 7:
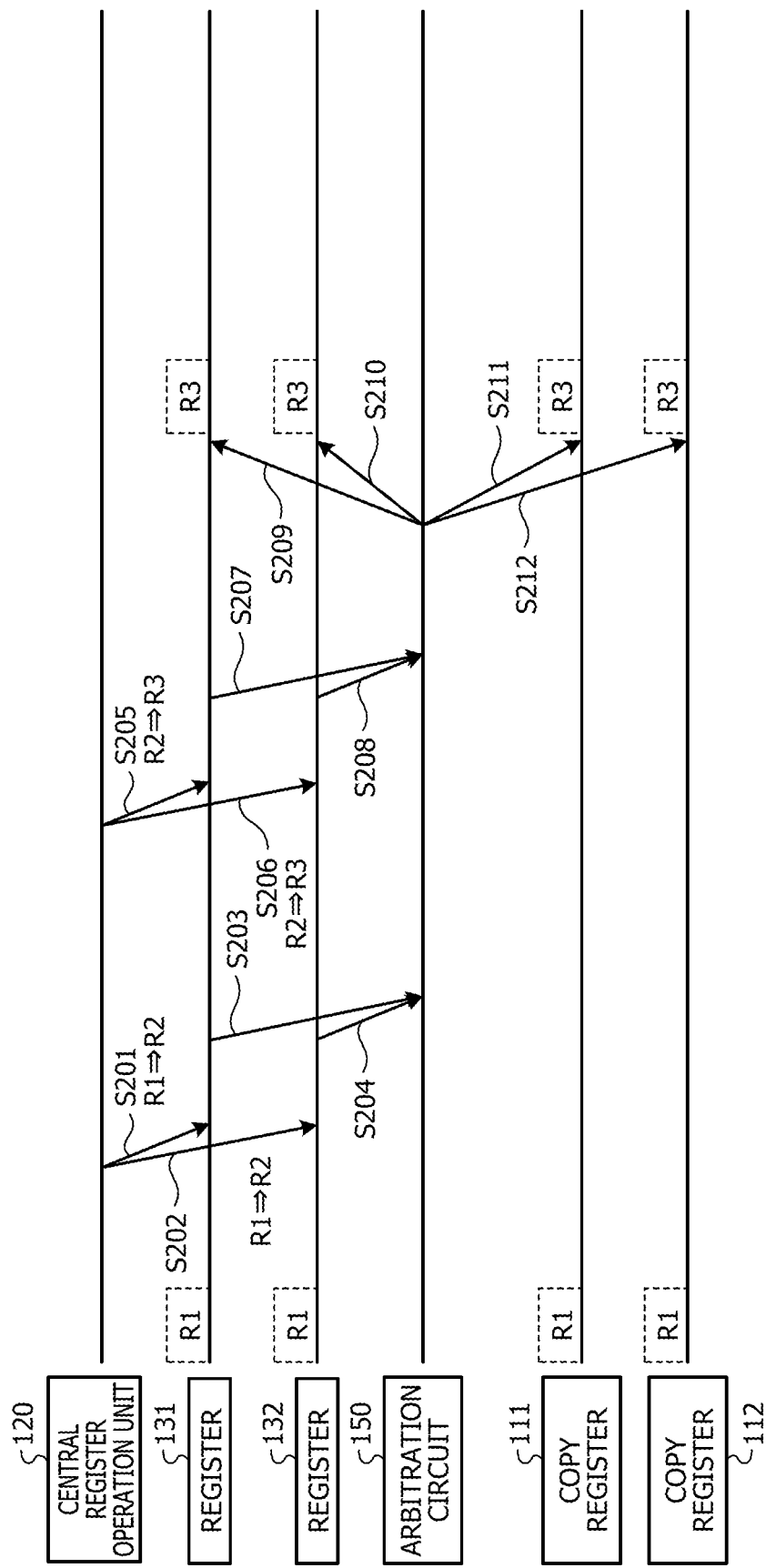
FIG. 7 is a sequence diagram of register value update processing in a case where no collision occurs according to Embodiment 2.

FIG. 7 is a sequence diagram of the register value update processing in a case where no collision occurs according to Embodiment 2. In this case, the processing is started from a state where the registers 131 and 132 and the copy registers 111 and 112 retain R1 as the register values. A case where the register values retained by the registers 131 and 132 are updated from R1 to R2 and the register values retained by the registers 131 and 132 are updated from R2 to R3 before the data matching circuit 502 starts the destination selection processing will be described as an example.

The central register operation unit 120 transmits R2 that is the register value to the registers 131 and 132 and gives an instruction to update the register value (steps S201 and S202).

The register 131 retains R2 as the standby data while maintaining R1 as the register value. Subsequently, the register 131 generates a register value notification packet in which the destination is the core 101 and the register value of the update data is R2. The register 131 outputs the generated register value notification packet to the arbitration circuit 150 and participates in the arbitration. The arbitration circuit 150 acquires the register value of R2 as the update data for the core 101 (step S203).

The register 132 retains R2 as the standby data while maintaining R1 as the register value. Subsequently, the register 132 generates a register value notification packet in which the destination is the core 102 and the register value of the update data is R2. The register 132 outputs the generated register value notification packet to the arbitration circuit 150 and participates in the arbitration. The arbitration circuit 150 acquires the register value of R2 as the update data for the core 102 (step S204).

Thereafter, before the data matching circuit 502 starts the destination selection processing, the central register operation unit 120 transmits R3 that is the register value to the registers 131 and 132 and gives an instruction to update the register value (steps S205 and S206).

The register 131 rewrites the retained standby data from R2 to R3 while maintaining R1 as the register value. Subsequently, the register 131 generates a register value notification packet in which the destination is the core 101 and the register value of the update data is R3. The register 131 outputs the generated register value notification packet to the arbitration circuit 150 and participates in the arbitration. The arbitration circuit 150 newly acquires, as the update data for the core 101, the register value of R3 and rewrites the register value from the previously retained R2 (step S207).

The register 132 rewrites the retained standby data from R2 to R3 while maintaining R1 as the register value. Subsequently, the register 132 generates a register value notification packet in which the destination is the core 102 and the register value of the update data is R2. The register 132 outputs the generated register value notification packet to the arbitration circuit 150 and participates in the arbitration. As the update data for the core 102, the arbitration circuit 150 newly acquires the register value of R3 and rewrites the register value from the previously retained R2 (step S208).

In accordance with the register value notification packet having the update data as the register value of R3, the arbitration circuit 150 performs arbitration and selects the core 101 as the update selected core 100. The arbitration circuit 150 selects, as the update matching core 100, the core 102 of which the register value matches the register value of the core 101. Since the update notification of the register value of the core 102 is yet to be performed, the core 102 is set as the update unnotified core 100. The arbitration circuit 150 outputs the data update command to the registers 131 and 132. At the same time, the arbitration circuit 150 outputs, as the update data, the register value of R3 to the registers 131 and 132. In this case, in the registers 131 and 132, since both the standby data and the received update data are the register values of R3, the register values are updated from R1 to R3 that is the standby data (steps S209 and S210).

The arbitration circuit 150 turns on the destination notification dedicated lines 201 and 202 linked to the core 101 that is the update selected core 100 and the core 102 that is the update unnotified core 100, respectively. The arbitration circuit 150 outputs, as the update data, R3 that is the register value by using the data notification line 210. Accordingly, the arbitration circuit 150 transmits, as the register value of the update data, R3 to the copy registers 111 and 112 included in the cores 101 and 102 of which the destination notification dedicated lines 201 and 202 are turned on. The copy registers 111 and 112 receive the input of the update data and updates the register value from R1 to R3 (steps S211 and 212).

The registers 131 and 132 do not transmit the data update completion notification and continues to receive the subsequent update command afterward. By the above, one update processing of the register value is completed.

Figure 8:
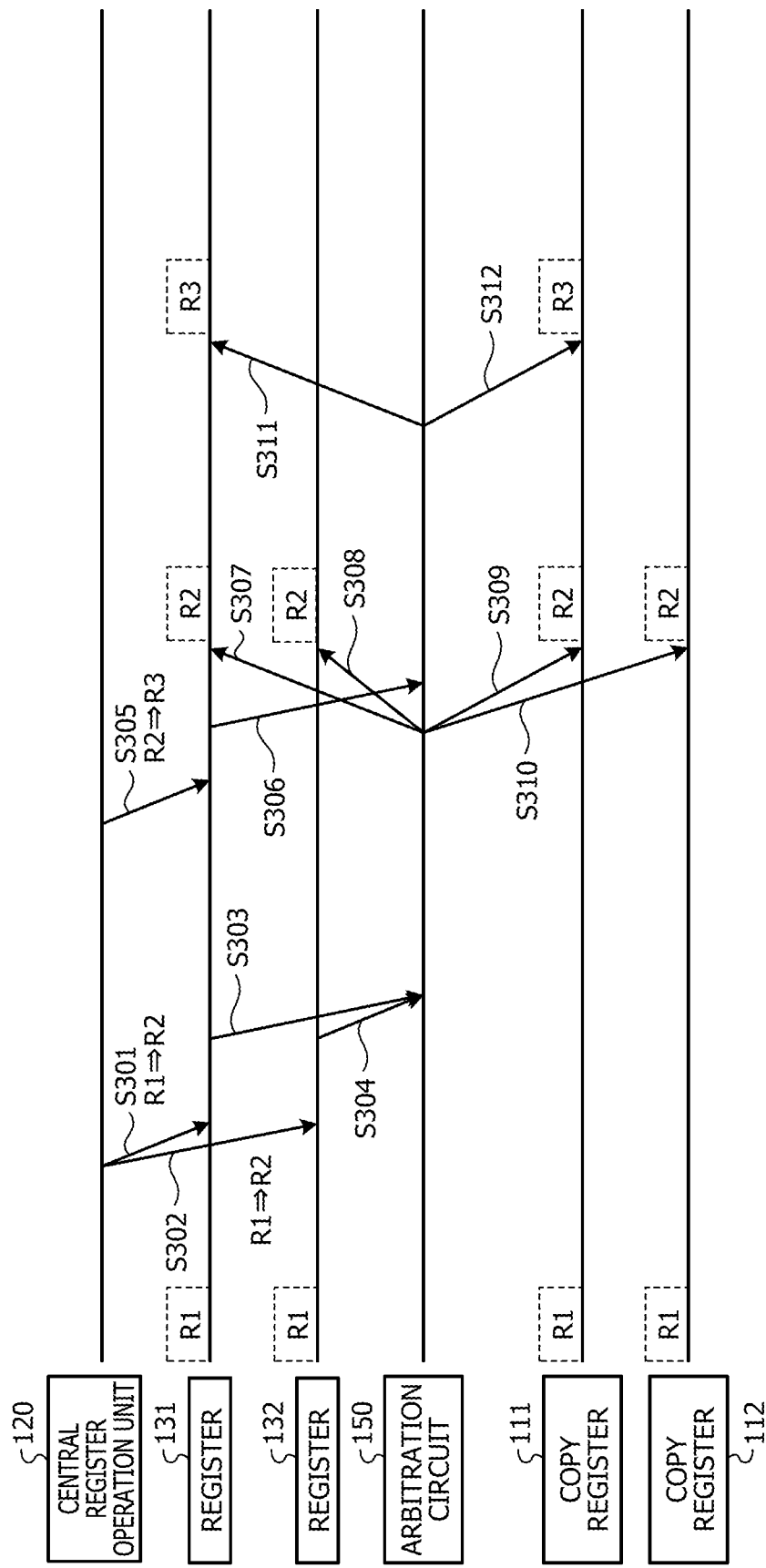
FIG. 8 is a sequence diagram of register value update processing in a case where a collision occurs according to Embodiment 2.

FIG. 8 is a sequence diagram of the register value update processing in a case where a collision occurs according to Embodiment 2. In this case, the processing is started from a state where the registers 131 and 132 and the copy registers 111 and 112 retain R1 as the register values. A case where the register values retained by the registers 131 and 132 are updated from R1 to R2 and the register value retained by the register 131 is updated from R2 to R3 in a state where the previous update processing is not completed will be described as an example.

The central register operation unit 120 transmits R2 that is the register value to the registers 131 and 132 and gives an instruction to update the register value (steps S301 and S302).

The register 131 retains R2 as the standby data while maintaining R1 as the register value. Subsequently, the register 131 generates a register value notification packet in which the destination is the core 101 and the register value of the update data is R2. The register 131 outputs the generated register value notification packet to the arbitration circuit 150 and participates in the arbitration. The arbitration circuit 150 acquires the register value of R2 as the update data for the core 101 (step S303).

The register 132 retains R2 as the standby data while maintaining R1 as the register value. Subsequently, the register 132 generates a register value notification packet in which the destination is the core 102 and the register value of the update data is R2. The register 132 outputs the generated register value notification packet to the arbitration circuit 150 and participates in the arbitration. The arbitration circuit 150 acquires the register value of R2 as the update data for the core 102 (step S304).

Thereafter, in a state where the previous update processing is not completed, the central register operation unit 120 transmits R3 that is the register value to the register 131 and gives an instruction to update the register value (step S305).

The register 131 rewrites the retained standby data from R2 to R3 while maintaining R1 as the register value. Subsequently, the register 131 generates a register value notification packet in which the destination is the core 101 and the register value of the update data is R3. The register 131 outputs the generated register value notification packet to the arbitration circuit 150. The arbitration circuit 150 newly acquires the register value of R3 as the additional update data for the core 101 while advancing the previous update processing (step S306).

In accordance with the register value notification packet having the update data as the register value of R2, the arbitration circuit 150 performs arbitration and selects the core 101 as the update selected core 100. The arbitration circuit 150 selects, as the update matching core 100, the core 101 of which the register values are all R2 and match the register values of the core 102. Since the update notification of the register value of the core 102 is yet to be performed, the core 102 is set as the update unnotified core 100. The arbitration circuit 150 outputs the data update command to the registers 131 and 132. At the same time, the arbitration circuit 150 outputs, as the update data, the register value of R2 to the registers 131 and 132. In this case, since the standby data is the register value of R3, the received update data is the register value of R2, and these pieces of data do not match with each other, the register 131 does not update the register value, and maintains the register value as R1 (step S307). By contrast, since both the standby data and the received update data are the register values of R2 and match each other, the register 132 updates the register value from R1 to R2 that is the standby data (step S308).

The arbitration circuit 150 turns on the destination notification dedicated lines 201 and 202 linked to the core 101 that is the update selected core 100 and the core 102 that is the update unnotified core 100, respectively. The arbitration circuit 150 outputs, as the update data, R3 that is the register value by using the data notification line 210. Accordingly, the arbitration circuit 150 transmits R2 as the register value of the update data to the copy registers 111 and 112 included in the cores 101 and 102 of which the destination notification dedicated lines 201 and 202 are turned on. The copy registers 111 and 112 receive the input of the update data and update the register value from R1 to R2 (steps S309 and S310).

Thereafter, the arbitration circuit 150 outputs, as new update data, the data update command to the register 131 that receives the input of the register value of R3. At the same time, the arbitration circuit 150 outputs, as the update data, the register value of R3 to the register 131. In this case, since the standby data and the received update data are the register values of R3 and match each other, the register 131 updates the register value from R1 to R3 that is the standby data (step S311).

The arbitration circuit 150 turns on the destination notification dedicated lines 201 and 202 linked to the core 101 that is the update selected core 100. The arbitration circuit 150 outputs, as the update data, R3 that is the register value by using the data notification line 210. Accordingly, the arbitration circuit 150 transmits, as the register value of the update data, R3 to the copy registers 111 included in the cores 101 and 102 of which the destination notification dedicated lines 201 and 202 are turned on. The copy register 111 receives the input of the update data, and updates the register value from R2 to R3 (step S312). Accordingly, one update processing of the register value is completed.

Figure 9A:
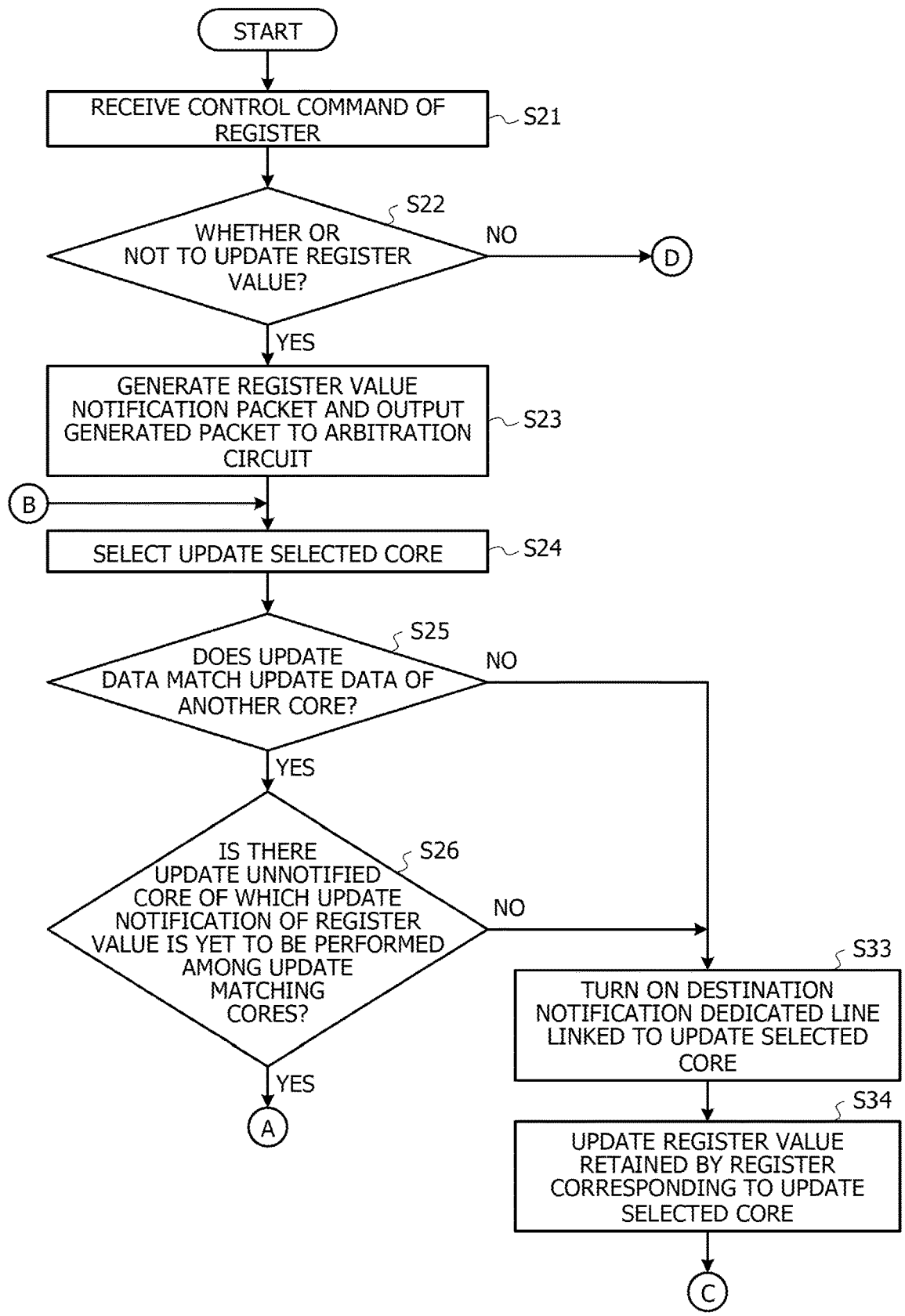

FIG. 9 is a flowchart of register value update processing in the CPU according to Embodiment 2. Next, a flow of the register value update processing in the CPU 10 according to the present embodiment will be described next with reference to FIG. 9.

The central register operation unit 120 receives the control command of the register from one or more cores 100 (step S21).

Subsequently, the central register operation unit 120 controls the corresponding register 130 in accordance with the received control command. Each register 130 determines whether or not to update the register value under the control of the central register operation unit 120 (step S22).

In a case where the update of the register value is not performed in all of the registers 130 (step S22: No), the register value update processing is ended.

By contrast, in a case where the update of the register value is performed in any register 130 (step S22: Yes), the register 130 that receives the update command of the register value retains, as the standby data, the new register value that is the update data. The register 130 generates the register value notification packet for notifying of the new register value, outputs the register value notification packet to the arbitration circuit 150, and participates in the arbitration (step S23).

The destination core selection circuit 501 of the arbitration circuit 150 receives the input of the information on the cores 100 that participate in the arbitration included in the register value notification packet. The destination core selection circuit 501 selects one update selected core 100 from among the cores 100 that participate in the arbitration (step S24). Thereafter, the destination core selection circuit 501 outputs the information on the update selected core 100 and information on cores 100 that participate in another arbitration to the data matching circuit 502.

The data matching circuit 502 receives, from the destination core selection circuit 501, the input of the information on the update selected core 100 and the information on the cores 100 that participate in another arbitration. The data matching circuit 502 determines whether or not the register value that is the update data of the update selected core 100 matches the register value that is the update data of the core 100 that participates in another arbitration (step S25).

In a case where there is the update matching core 100 of which the update data matches the update data of the update selected core 100 among the cores 100 that participate in another arbitration (step S25: Yes), the data matching circuit 502 determines whether or not there is the update unnotified core 100 of which the update notification of the register value is yet to be performed among the update matching cores 100 (step S26).

In a case where there is the update unnotified core 100 among the update matching cores 100 (step S26: Yes), the data matching circuit 502 turns on the destination selection signal to be input to the AND circuits 510 linked to the update selected core 100 and the update unnotified core 100. Accordingly, the arbitration circuit 150 turns on the destination notification dedicated lines 200 linked to the update selected core 100 and the update unnotified core 100 (step S27).

Subsequently, each register 130 receives the data update notification and the update data from the arbitration circuit 150. It is determined whether or not the update data and the standby data notified by each register 130 match each other, and thus, it is determined whether or not there is the register 130 of which the update data and the standby data do not match each other (step S28).

In a case where there is the register 130 of which the update data and the standby data do not match each other (step S28: Yes), the register 130 of which the updated data and the standby data do not match each other participates in the arbitration again (step S29). The register 130 of which the update data and the standby data do not match each other is referred to as a "non-matching register 130".

The arbitration circuit 150 outputs, as the data update command, the signal similar to the signal for turning on the destination notification dedicated line 200 to the registers 130 corresponding to the update selected core 100 and the update unnotified core 100 excluding the non-matching register 130. As a result, the register values of the registers 130 corresponding to the update selected core 100 and the update unnotified core 100 excluding the non-matching register 130 are updated to the standby data (step S30). Thereafter, the register value update processing branches into two kinds of processing of processing related to the non-matching register 130 and processing related to the registers 130 corresponding to the update selected core 100 and the update unnotified core 100 excluding the non-matching register 130. The processing related to the registers 130 corresponding to the update selected core 100 and the update unnotified core 100 excluding the non-matching register 130 proceeds to step S31, and the processing related to the non-matching register 130 returns to step S24.

The arbitration circuit 150 transmits the register value that is the update data to the copy register 110 of the core 100 of which the destination notification dedicated line 200 is turned on, and updates the register value retained by the copy register 110 to the new register value (step S31). Thereafter, the register value update processing is ended.

By contrast, in a case where there is no register 130 of which the update data and the standby data do not match each other (step S28: No), the arbitration circuit 150 outputs, as the data update command, the signal similar to the signal for turning on the destination notification dedicated line 200 to the registers 130 corresponding to the update selected core 100 and the update unnotified core 100. Accordingly, the register values of the registers 130 corresponding to the update selected core 100 and the update unnotified core 100 are updated to the standby data (step S32). Thereafter, the register value update processing proceeds to step S35.

By contrast, in a case where there is no update matching core 100 of which the update data matches the update data of the update selected core 100 among the cores 100 that participate in another arbitration (step S25: No), the register value update processing proceeds to step S33. Similarly, in a case where there is no update unnotified core 100 among the update matching cores 100 (step S26: No), the register value update processing proceeds to step S33. In this case, the data matching circuit 502 turns on the destination selection signal to be input to the AND circuit 510 linked to the update selected core 100. Accordingly, the arbitration circuit 150 turns on the destination notification dedicated line 200 linked to the update selected core 100 (step S33).

Thereafter, the arbitration circuit 150 outputs, as the data update command, the signal similar to the signal for turning on the destination notification dedicated line 200 to the register 130 corresponding to the update selected core 100. Accordingly, the register value of the register 130 corresponding to the update selected core 100 is updated to the standby data. Thereafter, the register 130 of which the register value is updated outputs the update completion notification to the central register operation unit 120 (step S34). Thereafter, the register value update processing proceeds to step S35.

Thereafter, the arbitration circuit 150 transmits the register value that is the update data to the copy register 110 of the core 100 of which the destination notification dedicated line 200 is turned on, and updates the register value retained by the copy register 110 with the new register value (step S35). Thereafter, the register value update processing is ended.

As described above, the processor according to the present embodiment does not perform the update of the register value and the update completion notification for the central register operation unit in a case where the standby data retained by the register and the update data used for the update do not match each other. Accordingly, the update completion notification in a state where an appropriate register value is not updated may be suppressed, and an erroneous operation due to a deviation between an update timing of the register value and a data transmission timing may be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
a plurality of cores to each of which a destination notification dedicated line is individually coupled;
a destination core selection circuit that receives a plurality of packets having some of the cores as destinations, respectively, to perform arbitration, and selects one first core from among the cores serving as the destinations of the plurality of packets; and
a data matching circuit that compares first transmission data included in a packet for the first core selected by the destination core selection circuit with second transmission data included in a packet for the core other than the first core serving as a destination to participate in the arbitration, extracts one or more second cores of which the second transmission data matches the first transmission data, designates the first core and the second core as the destinations by using the destination notification dedicated lines, and transmits the first transmission data via a data notification line,
wherein the first transmission data and the second transmission data are to be used respectively by the first core and the second core for performing an arithmetic operation respectively in the first core and the second core.

2. The processor according to claim 1, wherein the data matching circuit enables the first core and the second core by using the destination notification dedicated lines coupled to the first core and the second core, and transmits the first transmission data to the enabled first core and second core via the data notification line.

3. The processor according to claim 1, further comprising:
a plurality of registers corresponding to the cores, respectively,
wherein the data matching circuit receives, from the registers corresponding to the some cores, the packet for arbitration participation for notifying of a register value as the first transmission data or the second transmission data by using the some cores as the destinations, respectively, and extracts the second core that is the destination of the packet including the second transmission data of which the register value matches the register value of the first transmission data.

4. The processor according to claim 3, wherein, in a case where there is a difference between a retained first register value and a newly notified second register value, the register transmits the packet for the arbitration participation for notifying of the second register value to the data matching circuit.

5. The processor according to claim 4,
wherein the data matching circuit transmits a data update command with the first transmission data to the registers corresponding to the first core and the second core when the first transmission data is transmitted to the first core and the second core, and
the registers corresponding to the first core and the second core retain the second register value as standby data and receives the data update command and the first transmission data from the data matching circuit in a case where the packet for the arbitration participation is transmitted, updates the first register value to the second register value to end update processing in a case where the second register value and the register value indicated by the first transmission data match each other, and transmits the packet for the arbitration participation again without updating the first register value in a case where the second register value and the register value indicated by the first transmission data do not match each other.

6. An information processor apparatus comprising:
a memory, and
a processor coupled to the memory and including:
   a plurality of cores to each of which a destination notification dedicated line is individually coupled;
   a destination core selection circuit that receives a plurality of packets having some of the cores as destinations, respectively, to perform arbitration, and selects one first core from among the cores serving as the destinations of the plurality of packets; and
a data matching circuit that compares first transmission data included in a packet for the first core selected by the destination core selection circuit with second transmission data included in a packet for the core other than the first core serving as a destination to participate in the arbitration, extracts one or more second cores of which the second transmission data matches the first transmission data, designates the first core and the second core as the destinations by using the destination notification dedicated lines, and transmits the first transmission data via a data notification line,
   wherein the first transmission data and the second transmission data are to be used respectively by the first core and the second core for performing an arithmetic operation respectively in the first core and the second core.

7. An information processing method comprising:
receiving a plurality of packets having some of cores, among a plurality of cores to each of which a destination notification dedicated line is individually coupled, as destinations respectively for performing arbitration;
selecting one first core from among the cores serving as the destinations of the plurality of packets;
comparing first transmission data included in a packet for the selected first core with second transmission data included in a packet for the core other than the first core serving as a destination to participate in the arbitration;
extracting one or more second cores of which the second transmission data matches the first transmission data;
transmitting the first transmission data via a data notification line with designating the first core and the second core as the destinations by using the destination notification dedicated lines,
   wherein the first transmission data and the second transmission data are to be used respectively by the first core and the second core for performing an arithmetic operation respectively in the first core and the second core.

* * * * *